United States Patent
Marwah et al.

(10) Patent No.: US 11,397,413 B2
(45) Date of Patent: Jul. 26, 2022

(54) TRAINING MODELS BASED ON BALANCED TRAINING DATA SETS

(71) Applicant: EntIT Software LLC, Sunnyvale, CA (US)

(72) Inventors: Manish Marwah, Palo Alto, CA (US); Mijung Kim, Sunnyvale, CA (US); Pratyusa K. Manadhata, Piscataway, NJ (US)

(73) Assignee: Micro Focus LLC, Santa Clara, CA (US)

( * ) Notice: Subject to any disclaimer, the term of this patent is extended or adjusted under 35 U.S.C. 154(b) by 1107 days.

(21) Appl. No.: 15/689,047

(22) Filed: Aug. 29, 2017

(65) Prior Publication Data

US 2019/0064752 A1 Feb. 28, 2019

(51) Int. Cl.

| G06F 21/31 | (2013.01) |
| G05B 13/02 | (2006.01) |
| G06N 20/00 | (2019.01) |
| H04L 9/40 | (2022.01) |
| G06N 20/20 | (2019.01) |
| G06F 17/18 | (2006.01) |
| G06N 3/04 | (2006.01) |
| G06N 5/00 | (2006.01) |

(52) U.S. Cl.
CPC ......... *G05B 13/028* (2013.01); *G06F 21/316* (2013.01); *G06N 20/00* (2019.01); *G06N 20/20* (2019.01); *H04L 63/08* (2013.01); *H04L 63/1425* (2013.01); *G06F 17/18* (2013.01); *G06F 21/31* (2013.01); *G06N 3/0454* (2013.01); *G06N 5/003* (2013.01); *H04L 63/145* (2013.01); *H04L 2463/121* (2013.01)

(58) Field of Classification Search
None
See application file for complete search history.

(56) References Cited

U.S. PATENT DOCUMENTS

| 9,378,361 | B1 | 6/2016 | Yen et al. |
| 9,516,053 | B1 * | 12/2016 | Muddu ............... H04L 63/1433 |
| 9,667,641 | B2 | 5/2017 | Muddu et al. |
| 9,679,125 | B2 | 6/2017 | Bailor |

(Continued)

OTHER PUBLICATIONS

Chawla et al., "SMOTE: Synthetic Minority Over-Sampling Technique", 2002, AI Access Foundation and Morgan Kaufmann Publishers, Journal of Artificial Intelligence Research 16, all pages (Year: 2002).*

(Continued)

*Primary Examiner* — Daniel C Puentes

(57) ABSTRACT

In some examples, a system balances a number of positive data points and a number of negative data points, to produce a balanced training data set, where the positive data points comprise features associated with authentication events that are positive with respect to an unauthorized classification, and the negative data points comprise features associated with authentication events that are negative with respect to the unauthorized classification. The system trains a plurality of models using the balanced training data set, wherein the plurality of models are trained according to respective different machine learning techniques. The system selects a model from the trained plurality of models based on relative performance of the plurality of models.

20 Claims, 6 Drawing Sheets

(56) References Cited

U.S. PATENT DOCUMENTS

| | | | |
|---|---|---|---|
| 9,690,933 B1 | 6/2017 | Singh | |
| 2005/0105794 A1* | 5/2005 | Fung | G06K 9/6228 |
| | | | 382/159 |
| 2016/0030884 A1 | 10/2016 | Kent | |
| 2017/0093910 A1 | 3/2017 | Gukai | |
| 2018/0103052 A1* | 4/2018 | Choudhury | G06N 3/08 |

OTHER PUBLICATIONS

Revett et al, "A Machine Learning Approach to Keystroke Dynamics Based User Authentication" 2007, ResearchGate, all pages (Year: 2007).*

Chawla et al, "SMOTE: Synthetic Minority Over-Sampling Technique", 2002, Journal of Artificial Intelligence Research, all pages (Year: 2002).*

Lever, Jake et al. "Model selection and overfitting", Aug. 30, 2016, all pages (Year: 2016).*

Chawla el al., SMOTE: Synthetic Minority Over-Sampling Technique published Jun. 2002 (37 pages).

Kim et al., U.S. Appl. No. 15/689,045 entitled Extracting Features for Authentication Events filed Aug. 29, 2017 (36 pages).

Manadhata et al., U.S. Appl. No. 15/689,043 entitled Unauthorized Authentication Events filed Aug. 29, 2017 (26 pages).

Mike Scutt, Information Security, RAPID7 Community and Blog, Introspective Intelligence: What Makes Your Network Tick, What Makes It Sick? Nov. 17, 2016 (5 pages).

Musthaler et al., Fortscale's user behavioral analytics solution provides full context when truly malicious behavior is detected, Jan. 2016 (5 pages).

RAPID7—Detecting Lateral Movement with Windows Event Logs downloaded Jul. 31, 2017 (4 pages).

RAPID7, Technical Primer, Managed Detection and Response downloaded Jul. 31, 2017 (4 pages).

Rod Soto, Dynamic Population Discovery for Lateral Movement (Using Machine Learning), https://www.slideshare.net/RodSoto2/dynamic-population-discovery-for-lateral-movement-using-machine-learning, downloaded Jul. 19, 2017 (101 pages).

Siadati et al., Detecting Malicious Logins in Enterprise Networks Using Visualization, 2016 (8 pages).

STRATA-v4 https://www.slideshare.net/RamShankarSivaKumar/strata-2015-presentation-detecting-lateral-movement, downloaded Jul. 19, 2017 (34 pages).

Vectra Networks, White Paper, Detect Insider Attacks in Real Time https://yellowcube.eu/wp-content/uploads/2017/06/wp-insider-threat-detection.pdf, 2017 (6 pages).

Vectra Networks, The Data Science Behind Vectra Threat Detections—https://yellowcube.eu/wp-content/uploads/2017/06/the-data-science-behind-vectra-threat-detections.pdf, 2016 (10 pages).

Wikipedia, Gradient Boosting last edited Jul. 28, 2017 (10 pages).

Wikipedia, Random forest last edited Jul. 23, 2017 (10 pages).

* cited by examiner

TRAINING MODELS BASED ON BALANCED TRAINING DATA SETS

BACKGROUND

To gain access to a network, a user may use a credential such as a username and password, a certificate, a security key, and so forth. User credentials can be stolen by an unauthorized entity. For example, a user may disclose the user's credential to the unauthorized entity, which may be masquerading as a legitimate service. Alternatively, the unauthorized entity may include malware that can track a user's inputs to extract a credential entered by the user, or can access stored information to retrieve the credential.

BRIEF DESCRIPTION OF THE DRAWINGS

Some implementations of the present disclosure are described with respect to the following figures.

Figure 1:
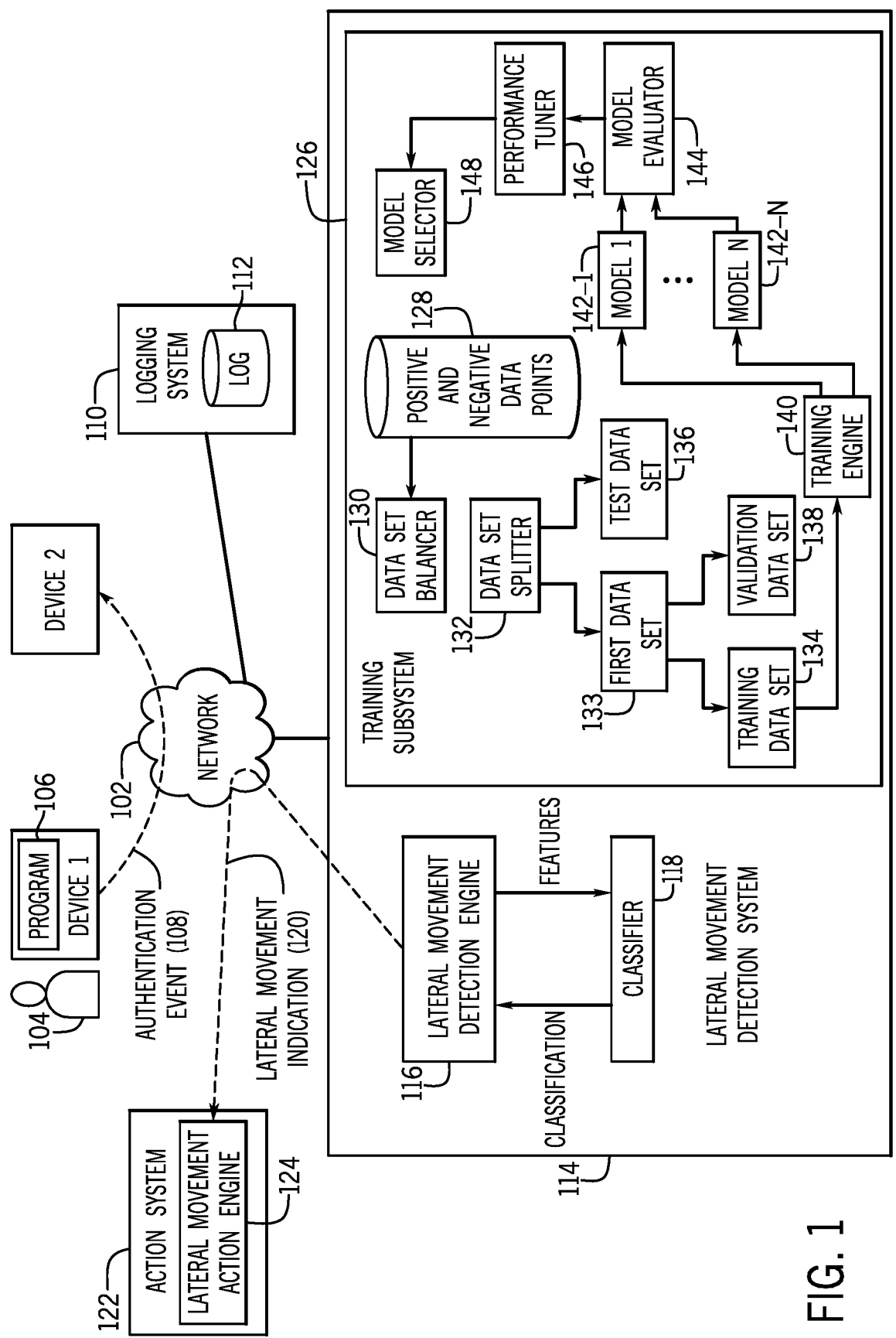
FIG. 1 is a block diagram of an arrangement that includes devices coupled over a network, and a lateral movement detection system according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Once an unauthorized entity has obtained a user's credential, the unauthorized entity can move within a network. The movement of the unauthorized entity within the network using a valid credential is referred to as lateral movement. By performing lateral movement, the unauthorized entity seeks to find other vulnerable users (to obtain credentials of such other users or to obtain sensitive information belonging to such other users), vulnerable devices, and sensitive information. With lateral movement, the unauthorized entity can also access devices in the network to obtain information stored by or accessible by such devices, or to use resources of the devices. Devices in the network may store sensitive information, or can have access to information that ulti-mately allows the unauthorized entity to access a data repository containing sensitive information. Sensitive information can refer to financial information, technical information, or any other information that an enterprise or individual wishes to protect against disclosure to unauthorized entities (users, programs, or machines).

Because lateral movement involves the access of users or devices by an unauthorized entity based on use of a valid credential, traditional security mechanisms, such as malware detectors, may not be able to detect the unauthorized use of the credential. For example, traditional security mechanisms may not be able to distinguish between a user's authorized use of the user's own credential and an unauthorized entity's use of the same credential after stealing it.

In accordance with some implementations of the present disclosure, a machine-learning based approach is used to distinguish unauthorized authentication events (that use stolen or compromised credentials) from benign authentication events (which are authentication events by authorized entities). To detect unauthorized authentication events (also referred to as detecting lateral movement), a classifier can be trained using a training data set. A classifier can also be referred to as a machine-learning model. A training data set refers to collections of features (sometimes arranged as feature vectors), where each collection of features is assigned a label indicating whether or not the collection of features is indicative of an unauthorized authorization event. A positive label specifies that the collection of features is indicative of unauthorized authentication event, while a negative label specifies that the collection of features is not indicative of an unauthorized authentication event.

The training data set is used to train a classifier to classify authentication events as positive or negative with respect to an unauthorized classification. The features of the training data set are extracted from various event data. Each collection of features (e.g., a feature vector) can also be referred to as a "data point." Each data point (a collection of features) of the training data set can be a positive data point or a negative data point. A positive data point includes features associated with an authentication event that is positive with respect to an unauthorized classification (i.e., the authentication event is an unauthorized authentication event), and a negative data point includes features associated with an authentication event that is negative with respect to the unauthorized classification (i.e., the authentication event is not an unauthorized authentication event).

A "feature" can refer to any characteristic that is extracted from event data associated with an authentication event. The feature can include an attribute retrieved from the event data, or an attribute computed based on the event data. In either case, the feature is considered to be extracted from event data.

Once the classifier is trained, the classifier is applied on a collection of features associated with events, where the events can include the given authentication event as well as the set of events that are temporally related to the given authentication event. A classifier applied on a collection of features can refer to any of: (1) one classifier applied on the collection of features, or (2) one classifier applied on multiple collections of features, or (3) multiple classifiers applied on one collection of features, or (4) multiple classifiers applied on multiple collections of features. The system determines, based on an output of the classifier, whether the given authentication event is an unauthorized authentication event associated with lateral movement.

An authentication event is generated when a user or program at a first device in a network attempts to log into a second device in the network by offering a user's credential to the second device. In some examples, a credential can include a combination of a username and a password, a security certificate, a security key, or any other information that can be used to determine whether the user or the program at the first device is authorized to access the second device.

In a large network, there can be a very large number of authentication events. Many authentication events are benign, with a relatively small percentage of authentication events being malicious. Examples of benign authentication events include a local authentication event at a device, such as when a user is at the device and logs into the device. Because a vast majority of authentication events are benign, a training data set can be skewed, with many more negative data points than positive data points. Training a classifier using such a skewed training data set can result in the classifier being biased towards a negative classification. To address the issue of a skewed training data set in some implementations of the present disclosure, balancing can be performed to balance a number of positive data points and a number of negative data points in the training data set. The balanced data set can then be used to train a classifier.

Balancing the number of positive data points and the number of negative data points can refer to reducing a difference between the number of positive data points and the number of negative data points. Thus, if there is a larger number of negative points than there are positive data points, then the number of negative data points can be reduced and/or the number of positive data points can be increased to reduce the difference between the number of negative data points and the number of positive data points. In practice, since the number of positive points can be several orders of magnitude less than number of negative points, only reducing negative points is likely to result in a small training data set, and thus a poorer quality model.

FIG. 1 shows an example where device 1 is coupled over a network 102 to device 2. The network 102 can include a wired network, a wireless network, or a combination of wired and wireless networks. Although just two devices as shown in FIG. 1, it is noted that a network arrangement can include more than two devices. Examples of devices include any or some combination of the following: a desktop computer, a notebook computer, a tablet computer, a smartphone, a server computer, a storage system, a communication node, or any other device that is capable of communicating over the network 102.

The devices can be part of an enterprise network, which is accessible by users of an enterprise (e.g., a company, a government agency, an educational organization, etc.). In other examples, the network 102 (or a portion of the network 102) can be a public network, such as the Internet.

A user 104 or a program 106 at device 1 can initiate an authentication event 108 with device 2. For example, the user 104 can type in the user's credential, or the user can use a security device (e.g., a badge, a smartphone, etc.) that stores a credential that can be communicated from the security device to device 1, such as by using a wireless connection (e.g., a Bluetooth link, a Wi-Fi link, a radio frequency identification (RFID) link, etc.). In another example, the user 104 at device 1 can attempt to authenticate a different user to device 2. The program 106, which includes machine-readable instructions, can include an application program, an operating system, and so forth. The program 106 can similarly provide a user's credential to initiate the authentication event 108.

In some examples, a logging system 110 can log event data of the authentication event 108 in a log 112, which can store various attributes off the authentication event 108. Examples of attributes in event data of an authentication event include any or some combination of the following: a timestamp (which indicates the time at which the authentication event 108 occurred), an identifier of an initiating user that initiated the authentication event 108 (the initiating user is already authenticated on the source device, and the initiating user wants to authenticate to the destination device—the initiating user wants to authenticate himself/herself, or authenticate a different user), an identifier of a destination user to be authenticated on a destination device (the destination user can be the same as the initiating user), an identifier of the source device (e.g., device 1), an identifier of a destination device (e.g., device 2), a type of authentication, a success/failure indication of the authentication event, and so forth. The log 112 can store event data of multiple authentication events among various devices that communicate over the network 102.

The log 112 can refer to a data repository (or multiple data repositories) to store event data. The log 112 can be stored on a storage device or a collection of storage devices.

In addition to logging event data of authentication events, the logging system 110 can also store event data of associated events in the log 112. In some examples, an associated event (that is associated with an authentication event) is an event that is temporally related to the authentication event. For example, the given authentication event can have a given timestamp specifying when the given authentication event occurred. An event is associated with the authentication event if the event occurred at a source device or a destination device and has a timestamp that is within a time window that includes the timestamp of the given authentication event. The associated events can include events of a different type from authentication events. The combination of an authentication event and associated events can be referred to as a context of the authentication event. Further information regarding associated events is provided below.

FIG. 1 also shows a lateral movement detection system 114 that is connected to the network 102. The lateral movement detection system 114 is able to access the log 112 over the network 102 to determine whether any given authentication event is an unauthorized authentication event. The lateral movement detection system 114 includes a lateral movement detection engine 116 and a classifier 118 that can be applied on features extracted from a context of an authentication event, where the context includes the authentication event and associated events (that are temporally related to the authentication event) to determine whether the authentication event is an unauthorized authentication event.

As used here, an "engine" can refer to a hardware processing circuit, which can include any or some combination of the following: a microprocessor, a core of a multi-core microprocessor, a microcontroller, a programmable gate array, a programmable integrated circuit device, or any other hardware processing circuit.

The classifier 118 that can be trained by the lateral movement detection system 114 and can be applied on features extracted from a context of a given authentication event to determine whether the given authentication event is an unauthorized authentication event.

The training of the classifier 118 can be performed by a training subsystem 126, which includes various modules that can perform respective tasks associated with training machine-learning models, evaluating the machine-learning models, tuning the performance of the machine-learning models, and selecting from among the machine-learning models.

These modules can be implemented as hardware processing circuits or combinations of hardware processing circuits and machine-readable instructions. The modules include a data set balancer 130 to balance a number of positive data points and a number of negative data points of a collection of positive and negative data points 128 to be used for training machine-learning models (classifiers).

The modules further include a data set splitter 132 to split a data set into a training data set 134, a test data set 136, and a validation data set 138. In addition, the modules includes a training engine 140 to train machine-learning models 142-1 to 142-N (where N>1), a model evaluator 144 to evaluate performance of the machine-learning models 142-1 to 142-N, a performance tuner 146 to tune performance of the machine-learning models 142-1 to 142-N, and a model selector 148 to select the machine-learning model from among the multiple machine-learning models 142-1 to 142-N. The selected machine-learning model can be the classifier 118.

In some examples, the model selector 148 can select just one machine-learning model. In other examples, the model selector 148 can select multiple machine-learning models for use as respective classifiers (as part of an ensemble of classifiers) for application on features to determine whether authentication events are authorized or unauthorized. More generally, note that selecting a machine-learning model can refer to selecting one machine-learning model, or alternatively, selecting multiple machine-learning models.

The lateral movement detection engine 116 can extract features from the context of an authentication event. The extracting of features from the context of the authentication event includes aggregating event data of the events that are part of the context. Aggregating event data involves calculating a metric based on event data of multiple events in the context. For example, the metric that can be computed can include a count, which is incremented in response to each occurrence of a specified event or an attribute of a specified event. In other examples, the metric that is computed can include a statistical measure that is derived from attributes of multiple events. In further examples, the metric that is computed can include a sum, a product, a mean, a median, a minimum, a maximum, quantiles, or any other type of metric.

If a lateral movement is detected, the lateral movement detection engine 116 can output a lateral movement indication 120 over the network 102 to an action system 122, which includes a lateral movement action engine 124. The lateral movement action engine 124 can take action to address the detected lateral movement, in response to the lateral movement indication 120. For example, the lateral movement action engine 124 can establish a communication with device 1, device 2, or both devices 1 and 2, to cause the device(s) to halt or stop any further activity. As more specific examples, the lateral movement action engine 124 can shut down processes at device 1 and/or device 2 to prevent unauthorized access of information or resources at device 1 and/or device 2. In other examples, the lateral movement action engine 124 can take other actions, including sending a notification of the detected lateral movement to an administrator or other user, or triggering other security responses to the detected lateral movement.

By using a classifier 118 that is trained, the detection of lateral movement is based on the intuition that network and device activities during a normal authentication event differs from network and device activities from an unauthorized authentication event. Such network and device activities can include the following. A new process can be started on the source device (e.g., device 1) or the destination device (e.g., device 2). A process can refer to any activity or machine-readable instructions (such as a thread or a program) that can be started at a device. Another network or device activity can include a Domain Name System (DNS) lookup, in which a device issues a DNS query to determine a network address (e.g., an Internet Protocol (IP) address) assigned to a domain name of the device. For example, the source device can issue a DNS lookup to the destination device or another device (whether in an internal network or in an external domain such as on the Internet). Alternatively, the destination device can issue a DNS lookup to the source device or another device.

Another network or device activity is a Hypertext Transfer Protocol (HTTP) request issued by a device. An HTTP request can be issued by a device to obtain information of another device. Thus, for example, the source device can issue an HTTP request to the destination device, or alternatively, the source device or destination device can issue an HTTP request to a different device (whether in an internal network or in an external domain such as on the Internet).

Another network or device activity includes a transfer of data between devices, such as between the source and destination devices, or between a source or destination device and a different device. A further network or device activity is a security event, where a security event can be any event that triggers a security action at the device. For example, the device may include a malware detector that detects suspicious activities at the device caused by a virus or other malware, which can trigger the malware detector to issue a security alert or to take other action, such as to quarantine a process or to stop a process. Examples of other security events include an alert issued by an intrusion detection system (which has detected intrusion into a device or network), a firewall alert issued by a firewall, and so forth.

Although the starting of processes, DNS lookups, HTTP requests, transfer of data, and/or security events may occur during either a benign authentication event or an unauthorized authentication event, such activities can differ for the benign authentication event and the unauthorized authentication event. For example, many more processes or a previously unseen process can be started on the source or destination device associated with an unauthorized authentication event, and/or a larger number of DNS lookups or HTTP requests can be associated with an unauthorized authentication event. Moreover, an unauthorized authentication event can also be associated with transfer of an unusually large amount of data.

The classifier 118 can be trained to detect such activities associated with unauthorized authentication events. Using information of a context of an authentication event, the classifier 118 can determine, based on the features extracted from the context, whether the authentication event is authorized or non-authorized.

Figure 2:
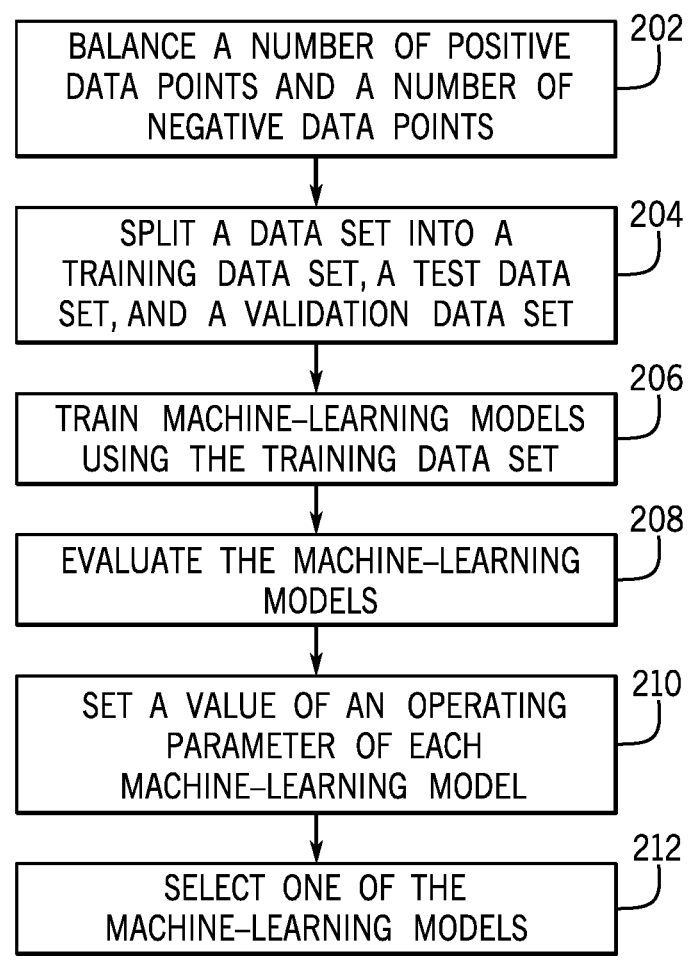
FIG. 2 is a flow diagram of a process of a lateral movement detection system according to some examples.

FIG. 2 is a flow diagram of a process of building machine-learning models for lateral movement detection, according to some examples. The process of FIG. 2 can be performed by various modules of the training subsystem 126 of FIG. 1.

The collection of positive and negative data points 128 includes an initial set of positive data points and an initial set of negative data points. The data set balancer 130 balances (at 202) the number of positive data points and the number of negative data points in the initial sets of positive and negative data points, respectively. In some examples, the number of positive data points in the initial set of positive data points can be several orders of magnitude less than the number of negative data points in the initial set of negative data points, which results in a highly skewed data set.

The balancing that is performed by the data set balancer 130 can use any of various techniques. For example, a first technique can perform sub-sampling for negative samples and sampling with replacement for positive samples. The positive data points and the negative data points are separately sampled. Because the number of negative data points is large, sub-sampling of the negative data points can be performed to select a subset of negative data points (negative samples) from the initial set of negative data points, where this subset includes a smaller number of negative data points than the initial set of negative data points. Sub-sampling can refer to selecting various samples of negative data points from the initial set of negative data points. For example, the selection of negative data points can be performed randomly, or can be performed according to another criterion (e.g., select every Mth negative data point, where M>1).

To obtain positive samples, sampling with replacement can be performed with respect to the initial set of positive data points to increase the number of positive data points relative to the initial set of positive data points. For example, to achieve a target ratio between the number of negative data points and the number of positive data points, sampling with replacement can be performed from the initial set of positive data points until the target ratio is achieved. Sampling positive data points with replacement refers to selecting a positive data point (a positive sample) from the initial set of positive data points, and after the selecting, the selected sample is placed back into the initial set of positive data points. A subsequent selection can thus be made from the entirety of the initial set of the positive data points, with some probability that the same positive data point that was previously selected may be selected again as a positive sample. The selection of positive samples from the initial set of positive data points continues (with replacement performed after each selection) until the target criterion is achieved (e.g., a target ratio between the number of negative data points and the number of positive data points is achieved).

In some examples, the number of negative samples selected and the target ratio to be achieved can be adjusted based on evaluation of performance of resulting machine-learning models produced by the training subsystem 126.

Although both sub-sampling for negative samples and sampling with replacement for positive samples can be used, it is noted that in other examples, just one of the foregoing can be performed to perform balancing of the number of positive data points and the number of negative data points.

Another technique that can be used for balancing the number of positive points and the number of negative data points is a Synthetic Minority Over-sampling Technique (SMOTE), such as described in Nitesh Chawla et al., entitled "SMOTE: Synthetic Minority Over-sampling Technique," Journal of Artificial Intelligence Research, pages 321-357 (2002).

In further examples, any other balancing technique that reduces the difference between the number of positive data points and the number of negative points can be used. The data set balancer 130 produces a balanced set of data points.

The data set splitter 132 splits (at 204) a data set into the training data set 134, the test data set 136, and the validation data set 138. In some examples, the data set that is split by the data set splitter 132 is the balanced data set that is produced by the data set balancer 130, where the balanced data set includes a number of positive data points and a number of negative data points that are more balanced than the initial set of positive data points and the initial set of negative data points. In other examples, the data set splitter 132 can first perform the data set splitting into the training data set 134, the test data set 136, and the validation data set 138, and these data sets can be balanced by the data set balancer 130.

The ensuing discussion assumes that the balancing is first performed by the data set balancer 130, followed by the data set splitting performed by the data set splitter 132. The data set splitter 132 can first split the balanced data set into a first data set 133 and the test data set 136. The splitting can be performed randomly, where data points in the balanced data set are randomly selected for inclusion in the first data set 133 or the test data set 136. To keep the balance between the positive data points and the negative data points, the positive data points can be split separately from the negative data points. For example, the split can be an 80/20 split, where 80% of the balanced data set is selected as the first data set 133, and 20% of the balanced data set is selected as the test data set 136. In other examples, the splitting of the balanced data set into the first data set 133 and the test data set 136 can use a different splitting ratio.

Additionally, the data set splitter 132 can split the first data set 133 into the training data set 134 and the validation data set 138. The positive data points of the first data set 133 can be split separately from the negative data points of the first data set 133, where the split can be according to a specified split ratio.

Once the training data set 134 has been created, the training engine 140 trains (at 206) machine-learning models 142-1 to 142-N using the training data set 134. The different machine-learning models 142-1 to 142-N can be trained based on the training data set 134 using respective different machine learning techniques. Examples of different machine learning techniques include a logistic regression technique, a random forests technique, a gradient boosting technique, a neural network technique, and so forth. Thus, a first machine-learning model can be trained based on the training data set 134 using a first machine learning technique, a second machine-learning model can be trained based on the training data set 134 using a second machine learning technique, and so forth.

Once the machine-learning models 142-1 to 142-N have been trained, the model evaluator 144 evaluates (at 208) performance of each of the machine-learning models 142-1 to 142-N. Evaluating each machine-learning model is based on the test data set 136. The performance of a machine-learning model can be evaluated in terms of a metric or multiple performance metrics. In some examples, one or some combination of the following performance metrics can be used:

Recall (also referred to as a true positive rate): the fraction of unauthorized authentication events that are correctly classified as positive events by the machine-learning model;

Precision: of the total number of authentication events classified as a positive by the machine-learning model, the fraction that are actually (true) positive;

F1 measure: a harmonic mean of recall and precision;

A false positive rate: of the total number of authorized authentication events (that is, negative events), the fraction that is wrongly classified by the machine-learning model as positive.

Although specific examples of performance metric are listed above, it is noted that in other examples, different performance metrics for evaluating the performance of the machine-learning models 142-1 to 142-N can be used.

Each of the foregoing performance metric has a value that is bound between 0 and 1. For example, for recall or precision, a value of 1 indicates perfect performance, while a value of 0 indicates the worst performance. The recall metric determines the fraction of the lateral movement events that were accurately detected by the machine-learning model, while precision determines the overhead on analysts that have to investigate unauthorized authentication events identified by the machine-learning model. The F1 measure provides a balance between recall and precision, and is bound between a value of 0 (bad performance) and 1 (good performance). If either recall or position is low, the F1 measure tends to be low.

The performance tuner 146 can set (at 210) a value of an operating parameter of each machine-learning model of the machine-learning models 142-1 to 142-N. In some examples, the output produced by a machine-learning model can be a probability of whether an authentication event is authorized or unauthorized. Given such a probabilistic output, a threshold probability value (an example of an operating parameter) can be set to classify an authentication event that is authorized or unauthorized. If the probability value produced by a machine-learning model is greater than the threshold probability value, then that indicates a positive classification (i.e., the authentication event is unauthorized). However, if the probability value output by the machine-learning model is less than the threshold probability value, then that indicates a negative classification (i.e., the authorization event is not unauthorized).

The threshold value is selected by the precision tuner 146 based on the validation data set 138.

The threshold set for a machine-learning model can affect the performance of the machine-learning model. If the threshold is set to high, then the machine-learning model tends to produce more false negatives. If the threshold is set to low, then the machine-learning model tends to produce more false positives.

Figure 3:
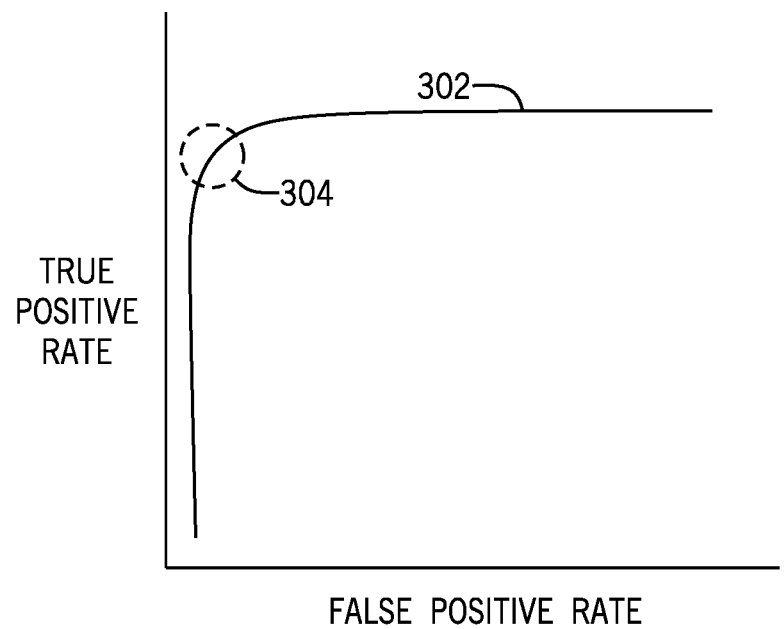
FIGS. 3 and 4 are graphs of curves with respect to machine-learning model performance metrics, according to various examples.

In some examples, a Receiver Operating Characteristic (ROC) curve can be used to select the threshold. In other examples, a precision-recall (PR) curve can be used to determine the threshold. As shown in FIG. 3, an ROC curve 302 is plotted with respect to a false positive rate on the horizontal axis and a true positive rate on the vertical axis. The threshold that is selected can generally be in a region 304 of the curve 302.

Figure 4:
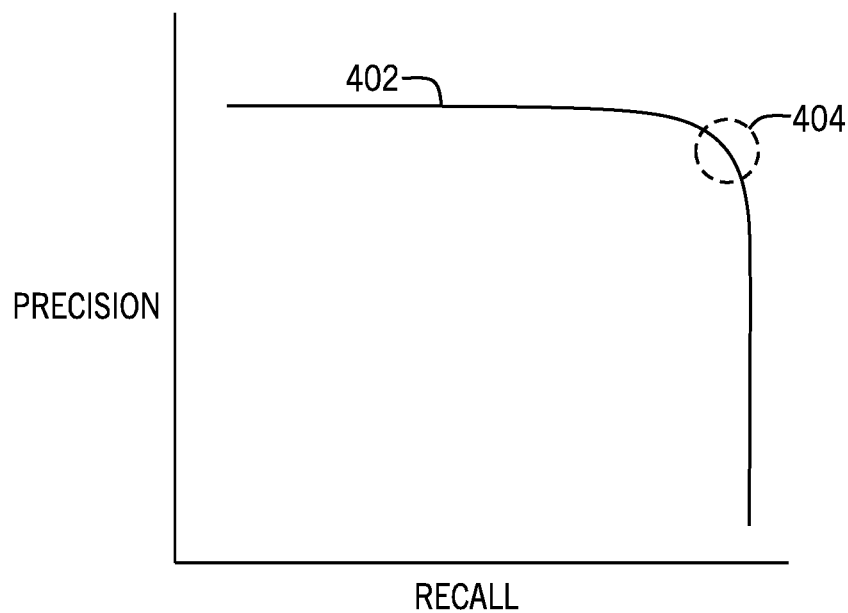

As shown in FIG. 4, a PR curve 402 is plotted with respect to a horizontal axis that represents recall and a vertical axis that represents precision. The threshold that is selected is in a region identified as 404.

It is noted that the ROC curve or the PR curve does not actually have to be plotted to allow for the performance tuner 146 to select the threshold for the machine-learning model. Rather, the performance tuner 146 can select the threshold for the machine-learning model in an automated fashion based on a specified criterion related to recall and/or precision. In some cases, precision may be given higher priority than recall if the overhead on analysts investigating positive authentication events identified by the machine-learning model is a high concern. In other cases, recall can be given a higher priority.

In further examples, a cost function can be defined, where the cost function is based on recall and precision. The threshold that is selected can be based on an optimal value of the cost function, based on a specified objective.

In other examples, instead of setting a threshold as the operating parameter of each machine-learning model, a different operating parameter (or a collection of multiple operating parameters) can be set by the performance tuner 146.

Once the trained machine-learning models have been performance tuned, then the model selector 148 can select (at 212) one of the machine-learning models to be used as the classifier 118. Note that in other examples, multiple machine-learning models can be selected by the model selector 148 for use as respective classifiers of an ensemble of classifiers. The selection of the machine-learning model from among the machine-learning models 142-1 to 142-N can be based on use of the validation data set 138. The performance measure used to select the best performing machine-learning model is a measure that represents the area under the ROC curve or PR curve.

The validation data set 138 includes positive data points and negative data points. The model selector 148 can use the labels of the positive and negative data points in the validation data set 138 to determine the performance of each machine-learning model. If a machine-learning model produces classifications that match more of the labels of the positive and negative data points in the validation data set 138, then that machine-learning model is indicated as having a higher performance. The model selector 148 can select the machine-learning model with the best performance from among the machine-learning models 142-1 to 142-N. or alternatively, can select multiple machine-learning models with better performances.

Figure 5:
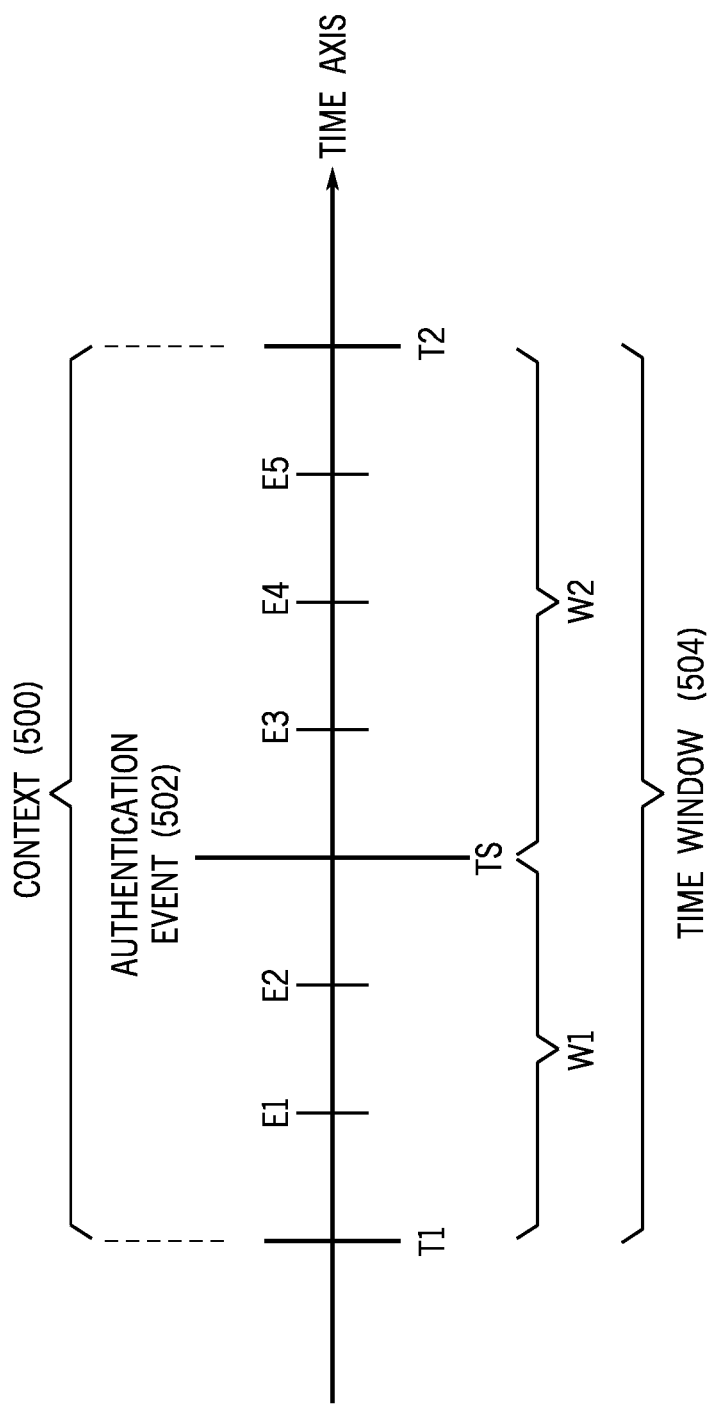
FIG. 5 shows an example context of an authentication event derived according to some examples.

FIG. 5 shows an example of how a context 500 for an authentication event 502 is determined. The authentication event 502 occurred at time TS, as represented by the timestamp of the event data representing the authentication event 502. A time window 504 is defined with respect to the time TS of the authentication event 502. The time window 504 includes the time TS of the authentication event 502. In examples according to FIG. 5, the time window 504 also includes a time interval W1 before the time TS, and a time interval W2 after the time TS. In some examples, W1 is equal to W2. In other examples, W1 is different from W2.

The time window 504 of FIG. 5 starts at time T1 (=TS−W1), and ends at time T2 (=TS+W2). Within the time window 504, various events E1 and E2 can occur at the source device (e.g., device 1 in FIG. 1) in the time interval W1 before the time TS of the authentication event 502, and various events E3, E4, and E5 can occur at the destination device (e.g., device 2 in FIG. 1) in the time interval W2 after the time TS.

The various events E1, E2, E3, E4, and E5 can include events corresponding to any of the activities noted above, such as starting a new process, performing a DNS lookup, performing an HTTP request, transferring data, a security event, or any other event.

Event data associated with the events E1, E2, E3, E4, and E5 is logged by the logging system 110 (FIG. 1) into the log 112 along with the event data of the authentication event 502.

In some examples, the values of W1 and W2 can be preset, such as by an administrator or other user. In further examples, the values of W1 and W2 can be learnt by the lateral movement detection engine 116 based on an analysis of past data and based on feedback provided regarding classifications of authentication events by the classifier 118. For example, a user can indicate that a classification made by the classifier 118 is correct or incorrect, and the classifier 118 can use this feedback to update itself.

Examples of features that can be extracted from a context of an authentication event can include any or some combination of the following: a number (or count) of authentication events at the source device, a number of failed authentication events at the source device in the time window (e.g., 504 in FIG. 5) of the authentication event, a number of authentication events at the destination device in the time window, a number of failed authentication events at the source device in the time window, a number of failed authentication events at the destination device in the time window, a measure associated with processes that were started at the source device and at the destination device in the time window, a number of DNS events at the source device in the time window, a number of DNS events at the destination device in the time window, a number of connections from the source device in the time window, an amount of bytes communicated by the source device in the time window, a total number of packets communicated by the source device in the time window, a number of connections for the destination device in the time window, an amount of data communicated by the destination device in the time window, a total number of packets communicated by the destination device in the time window, and so forth.

Figure 6:
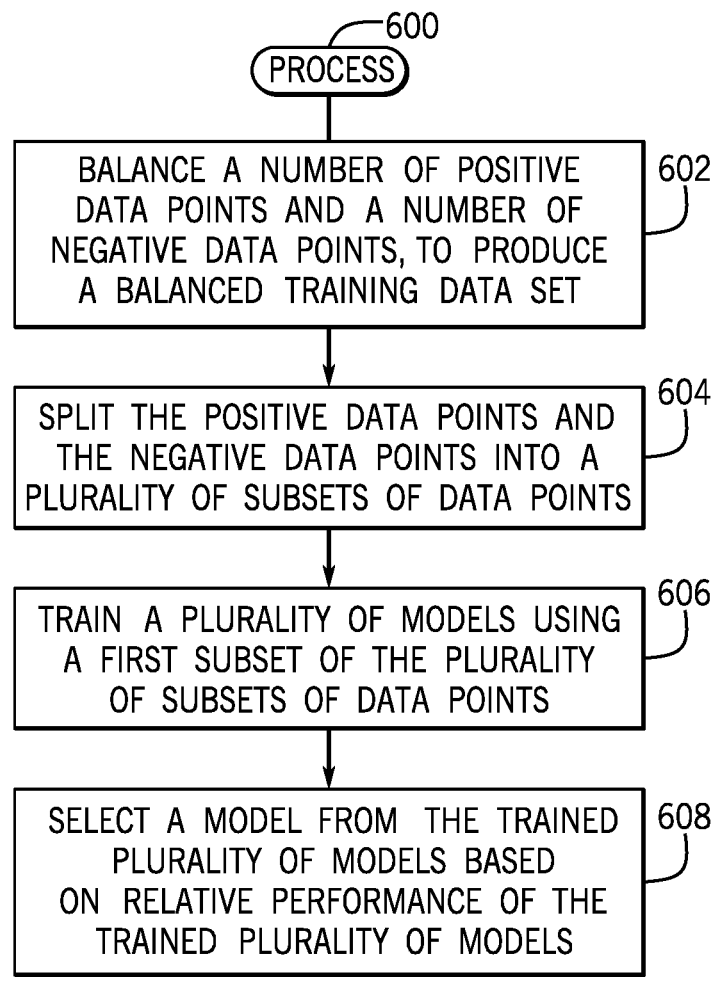
FIG. 6 is a flow diagram of a process according to some examples.

FIG. 6 is a flow diagram of a process 600 according to further implementations, which can be performed by the training subsystem 126, for example. The process 600 balances (at 602) a number of positive data points and a number of negative data points, to produce a balanced training data set. The positive data points include features associated with authentication events that are positive with respect to an unauthorized classification (i.e., the authentication event are unauthorized authentication events), and the negative data points comprise features associated with authentication events that are negative with respect to the unauthorized classification (i.e., the authentication event are authorized authentication events).

The process 600 further splits (at 604) the positive data points and the negative data points into a plurality of subsets of data points. The process 600 trains (at 606) a plurality of models using a first subset of the plurality of subsets of data points, where the plurality of models are trained according to respective different machine learning techniques. The process 600 selects (at 608) a model from the trained plurality of models based on relative performance of the trained plurality of models. Note that selecting a model can refer to selecting just one model, or alternatively, to selecting multiple models.

Figure 7:
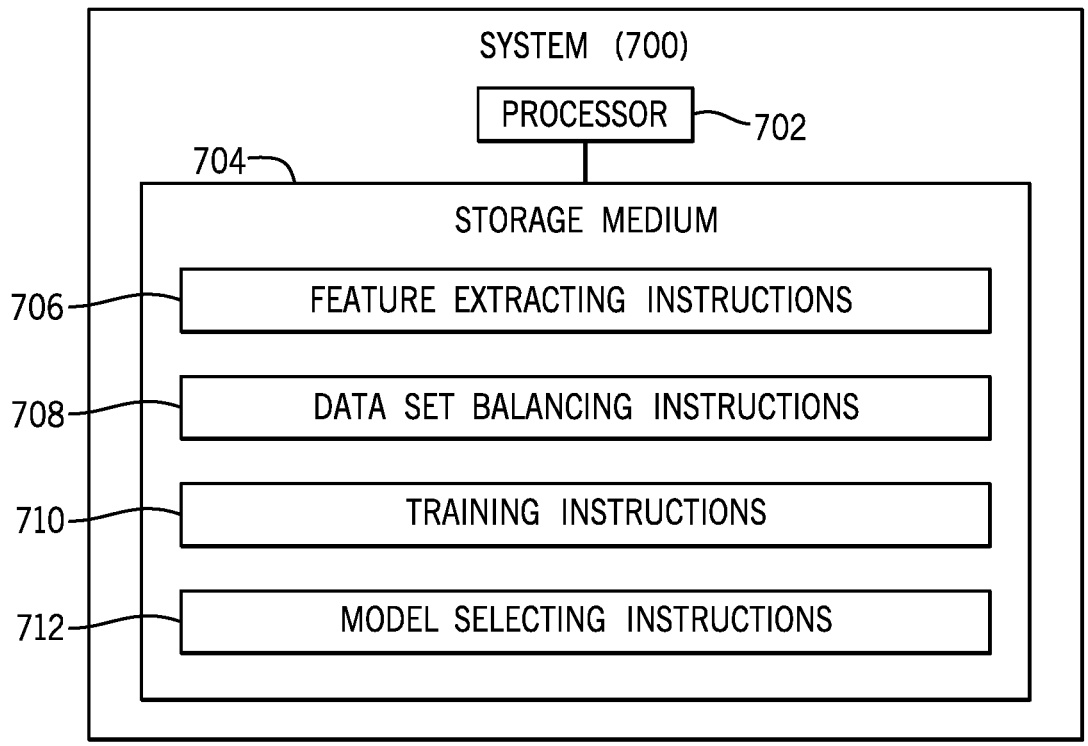
FIG. 7 is a block diagram of a system according to further examples.

FIG. 7 is a block diagram of a system 700 that includes a processor (or multiple processors) 702. The system 700 further includes a non-transitory machine-readable or computer-readable storage medium 704 storing machine-readable instructions that are executable on the processor 702 to perform various tasks. Machine-readable instructions executable on a processor to perform a task can refer to machine-readable instructions executable on a single processor or on multiple processors to perform the task. A processor can include a microprocessor, a core of a multi-core microprocessor, a microcontroller, a programmable integrated circuit, a programmable gate array, or another hardware processing circuit.

The machine-readable instructions include feature extracting instructions 706 to extract features for authentication events and assign labels to collections of the features, each label of the labels being positive or negative with respect to an unauthorized classification of a respective authentication event. The machine-readable instructions further include data set balancing instructions 708 to produce a balanced training data set by balancing a number of collections of features assigned a positive label and a number of collections of features assigned a negative label. The machine-readable instructions further include training instructions 710 to train a plurality of models using the balanced training data set, where the plurality of models are trained according to respective different machine learning techniques. The machine-readable instructions further include model selecting instructions 712 to select a model from the trained plurality of models based on relative performance of the plurality of models.

Figure 8:
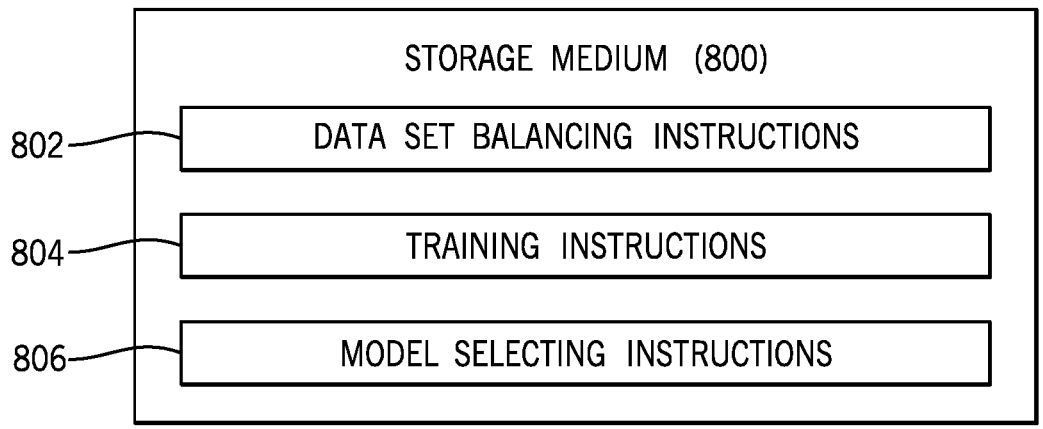
FIG. 8 is a block diagram of a storage medium storing machine-readable instructions according to additional examples.

FIG. 8 is a block diagram of a non-transitory machine-readable or computer-readable storage medium 800 storing machine-readable instructions that upon execution cause a system to perform various tasks. The machine-readable instructions include data set balancing instructions 802 to balance a number of positive data points and a number of negative data points, to produce a balanced training data set, where the positive data points comprise features associated with authentication events that are positive with respect to an unauthorized classification, and the negative data points comprise features associated with authentication events that are negative with respect to the unauthorized classification.

The machine-readable instructions further include training instructions 804 to train a plurality of models using the balanced training data set, where the plurality of models are trained according to respective different machine learning techniques. The machine-readable instructions further include model selecting instructions 806 to select a model from the trained plurality of models based on relative performance of the plurality of models.

The storage medium 704 (FIG. 7) or 800 (FIG. 8) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:

balance a number of positive data points and a number of negative data points, to produce a balanced data set, wherein the positive data points are each indicative of an unauthorized authentication event and each comprise features associated with unauthorized lateral movement in a network, and the negative data points are each indicative of an authorized authentication event and each comprise features associated with the authorized authentication event;

split the balanced data set into a training data set, a test data set, and a validation data set;

train a plurality of models using the training data set, wherein each model of the plurality of models is trained according to respective different machine learning techniques;

evaluate each model of the trained plurality of models using the test data set, wherein evaluating each model of the trained plurality of models comprises evaluating a performance of each model of the plurality of models using the test data set;

select a threshold probability value used by each model of the trained plurality of models to classify an authentication event as positive or negative with respect to the unauthorized lateral movement in the network, wherein the threshold probability value is selected based on the validation training set;

select a model from the trained plurality of models based on the evaluating of each model of the trained plurality of models and a relative performance of each model of the plurality of models; and apply the selected model to a detected authentication event, wherein applying the model to the detected authentication event distinguishes the detected authentication event as either an authorized authentication event or an unauthorized lateral movement in the network.

2. The non-transitory machine-readable storage medium of claim 1, wherein the balancing is performed on a collection of positive and negative data points, and the balancing comprises:
sub-sampling the negative data points in the collection of positive and negative data points to reduce the number of the negative data points.

3. The non-transitory machine-readable storage medium of claim 1, wherein the balancing is performed on a collection of positive and negative data points, and the balancing comprises:
sampling with replacement the positive data points in the collection of positive and negative data points to increase the number of the positive data points.

4. The non-transitory machine-readable storage medium of claim 1, wherein the balancing is performed on a collection of positive and negative data points, and the balancing comprises:
reducing a difference between the number of positive data points and the number of negative data points.

5. The non-transitory machine-readable storage medium of claim 1, wherein the plurality of models are trained using two or more of a logistic regression technique, a random forests technique, a gradient boosting technique, or a neural network technique.

6. The non-transitory machine-readable storage medium of claim 1, wherein selecting a model from the trained plurality of models based on the relative performance of each model of the trained plurality of models is further based on the performance of each model of the trained plurality of models using the validation data set.

7. The non-transitory machine-readable storage medium of claim 1, wherein the instructions upon execution cause the system to:
apply the selected model on features extracted for a received authentication event to determine whether the received authentication event is positive with respect to the unauthorized lateral movement in the network.

8. The non-transitory machine-readable storage medium of claim 1, wherein applying the selected model to the detected authentication event distinguishes the detected authentication event as either an authorized authentication event or an unauthorized lateral movement in the network based on the selected threshold probability value for the selected model.

9. A system comprising:
a processor; and
a non-transitory storage medium storing instructions executable on the processor to:
extract features for authentication events and assign labels to collections of the features, the labels comprising a positive label indicative of one or more unauthorized authentication events and each comprising features associated with unauthorized lateral movement in a network, and a negative label indicative of one or more authorized authentication events and each comprising features associated with the one or more authorized authentication events;
produce a balanced data set by balancing a number of collections of features assigned a positive label and a number of collections of features assigned a negative label;
split the balanced data set into a training data set, a test data set, and a validation data set;
train a plurality of models using the training data set, wherein each model of the plurality of models is trained according to respective different machine learning techniques;
evaluate each model of the plurality of models using the test data set, wherein evaluating each model of the plurality of trained models comprises evaluating a performance of each model of the plurality of models using the test data set;
select a threshold probability value used by each model of the trained plurality of models to classify an authentication event as positive or negative with respect to the unauthorized lateral movement in the network and wherein the threshold probability value is selected based on the validation training set;
select a model from the trained plurality of models based on the evaluating of each model of the trained plurality of models and a relative performance of each model of the plurality of models; and
apply the selected model to a detected authentication event, wherein applying the model to the detected authentication event distinguishes the detected authentication event as either an authorized authentication event or an unauthorized lateral movement in the network.

10. The system of claim 9, wherein the balancing comprises increasing the number of collections of features assigned the positive label relative to the collections of features assigned the negative label.

11. The system of claim 9, wherein the balancing comprises decreasing the number of collections of features assigned the negative label relative to the collections of features assigned the positive label.

12. The system of claim 9, wherein the plurality of models is trained using two or more of a logistic regression technique, a random forests technique, a gradient boosting technique, or a neural network technique.

13. The system of claim 9, wherein the selecting of the model from the trained plurality of models based on a relative performance of each of the plurality of models is further based on the performance of each model of the plurality of models using the validation data set.

14. The system of claim 9, wherein applying the selected model to the detected authentication event distinguishes the detected authentication event as either an authorized authentication event or an unauthorized lateral movement in the network based on the selected threshold probability value for the selected model.

15. A method comprising:
- balancing, by a system comprising a processor, a number of positive data points and a number of negative data points, to produce a balanced data set, wherein the positive data points are each indicative of an unauthorized authentication event and each comprise features associated with an unauthorized lateral movement in a network, and the negative data points are each indicative of an authorized authentication event and each comprise features associated with the authorized authentication event;
- splitting, by the system, the balanced data set into a training data set, a test data set, and a validation data set;
- training, by the system, a plurality of models using training data set, wherein each model of the plurality of models is trained according to respective different machine learning techniques;
- evaluating, by the system, each model of the trained plurality of models using the test data set, wherein evaluating each model of the trained plurality of models comprises evaluating a performance of each model of the plurality of models using the test data set;
- selecting, by the system, a threshold probability value used by each model of the trained plurality of models to classify an authentication event as positive or negative with respect to the unauthorized lateral movement in the network, wherein the threshold probability value is selected based on the validation training set;
- selecting, by the system, a model from the trained plurality of models based on the evaluating of each model of the trained plurality of models and a relative performance of each model of the trained plurality of models; and
- applying, by the system, the selected model to a detected authentication event, wherein applying the model to the detected authentication event distinguishes the detected authentication event as either an authorized authentication event or an unauthorized lateral movement in the network.

16. The method of claim 15, wherein the selecting a model from the trained plurality of models is based on evaluation of each model of the trained plurality of models based on the relative performance of each model of the trained plurality of models is further based on the performance of each model of the trained plurality of models using the validation data set.

17. The method of claim 15, wherein the features of the positive and negative data points comprise features extracted from events, the events comprising at least one selected from among: starting a new process at a device, performing a domain name system (DNS) lookup between devices, a transfer of data between devices, a security event on a device, and a Hypertext Transfer Protocol (HTTP) request event.

18. The method of claim 15, wherein applying the selected model to the detected authentication event distinguishes the detected authentication event as either an authorized authentication event or an unauthorized lateral movement in the network based on the selected threshold probability value for the selected model.

19. The method of claim 15, wherein the plurality of models are trained using two or more of a logistic regression technique, a random forests technique, a gradient boosting technique, or a neural network technique.

20. The method of claim 15, wherein selecting a model from the trained plurality of models based on the relative performance of each model of the trained plurality of models is further based on the performance of each model of the trained plurality of models using the validation data set.

* * * * *